United States Patent Office 3,043,866
Patented July 10, 1962

3,043,866
CHLOROPYROCATECHOL SULFONIC ACID COMPOUNDS
Phyllis D. Oja, Walnut Creek, Calif., assignor to The Dow Chemical Company, Midland, Mich., a corporation of Delaware
No Drawing. Filed Dec. 5, 1958, Ser. No. 778,326
3 Claims. (Cl. 260—512)

This invention is concerned with chloropyrocatechol sulfonic acid compounds and particularly with those having the structure

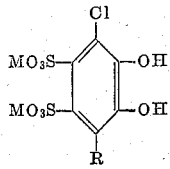

In this and succeeding formulae, R is —Cl or —SO$_3$M, and M is hydrogen or alkali metal. Embraced in this invention are the hydrated forms of the above which are formed, particularly when M is an alkali metal.

The compounds are white crystalline solids and frequently obtained as hydrates. The compounds are soluble in water. The compounds in the salt form are of relatively low solubility in ethanol, acetone and benzene.

The compounds are useful as parasiticides and herbicides. They are further useful chelating agents and have diversified uses for the purposes of polyvalent metal ion control.

The compounds in the salt form, i.e., where M is alkali metal in the above formula, may be prepared by the reaction of o-chloranil having the structure

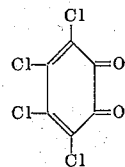

with an alkali metal sulfite.

The compounds in the free acid form, i.e., where M is hydrogen in the above formula, may be prepared by removing alkali metal ions from solutions of the salts by contacting with cation exchange resins in their acid form.

The proportions of the reactants employed in preparing the products in the salt form is not critical, some of the desired product being formed when any proportion is employed. It is preferred however that an excess of the alkali metal sulfite be employed. A preferred excess is considered to be about four moles of alkali metal sulfite per mole of o-chloranil.

The reaction is usually carried out in a liquid reaction medium to provide better contact between the reactants. Usually water is employed as reaction medium or as one of the solvents contributing to the reaction medium. By use of water at least one of the reactants, namely the alkali metal sulfite, is kept in complete solution during the reaction. The chloranil reactant may be dispersed in the water or dissolved in a suitable solvent therefor such as methylene dichloride, benzene, ether, methanol and carbon tetrachloride. Good contact is maintained between the reactants by mechanical agitation.

The reaction is exothermic and takes place in the temperature range of from about 10° C. to 90° C. Care must be taken to maintain the reaction in the above temperature range to avoid degradation of the product. This may be accomplished by precooling of the reactants, external cooling or by portionwise mixing of the reactants, or a combination of these procedures. When the reaction is carried out in this manner, the reaction proceeds rapidly and smoothly with the temperature of the reaction mixture rising to about 40°–50° C. In order to insure completion of the reaction, the mixture is preferably allowed to stand at room temperature for a few hours. Alternatively the reaction mixture may be heated for a short period to a temperature not in excess of 90° C.

When the reaction is carried out in accordance with the above procedure, a mixture of the products are obtained. The products may be separated by fractional crystallization from the reaction mixture or from added solvent such as water.

In a preferred method of carrying out the reaction, an aqueous solution of alkali metal sulfite is added portionwise with stirring to an aqueous slurry of o-chloranil. After completion of the addition, the reaction mixture is allowed to stand for a period of time at room temperature to obtain the alkali metal salt of 4-chloro-5,6-dihydroxy-1,2,3-benzenetrisulfonic acid which precipitates in the reaction mixture. The latter is recovered by filtration and the filtrate concentrated by heating under reduced pressure to precipitate the alkali metal salt of 3,6-dichloro-4,5-dihydroxy-1,2-benzenesulfonic acid. The latter is recovered by filtration and purified by conventional procedures.

The alkali metal salts of the products thus prepared are dissolved in water and the aqueous solution passed through a column of cation exchange resin in the acid form to produce the corresponding free chloropyrocatechol sulfonic acids. Suitable cation exchange resins are those containing a group such as —SO$_3$H on a polymeric skeleton such as phenol-formaldehyde polystyrene, styrene-divinylbenzene, polyolefins and the like. Alternatively, the free acids may be prepared by treating the alkali metal salts with mineral acids.

The following examples illustrate the invention but are not to be construed as limiting.

*Example 1.—Trisodium 4-Chloro-5,6-Dihydroxy-1,2,3-Benzenetrisulfonate Monohydrate*

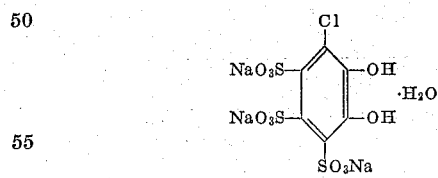

A cooled (about 10° C.) solution of 50.5 grams (0.40 mole) of sodium sulfite in 150 milliliters of water was mixed with a solution of 24.6 grams (0.10 mole) of o-chloranil in 100 milliliters of methylene dichloride whereupon a very vigorous reaction took place with precipitation of a solid in the mixture. The resulting mixture was allowed to stand at ambient temperature for 0.5 hour and thereafter water added to bring the volume of the reaction mixture to about 300 milliliters. The mixture was then heated to about 90° C. During the heating most of the solid dissolved. The warm solution was filtered and the filtrate allowed to cool to precipitate the trisodium 4-chloro-5,6-dihydroxy-1,2,3-benzenetrisulfonate monohydrate product as a white crystalline solid. The product after recrystallization from water decomposed above 300° C. The product had the following elemental composition (percent):

|  | Carbon | Hydrogen | Sodium | Sulfur |
|---|---|---|---|---|
| Found | 14.6 | 0.7 | 14.3 | 19.7 |
| Theoretical | 15.4 | 0.8 | 14.7 | 20.5 |

*Example 2.—Trisodium 4-Chloro-5,6-Dihydroxy-1,2,3-Benzenetrisulfonate Monohydrate*

10 grams (0.08 mole) of sodium sulfite was added portionwise with stirring to a slurry of 5.0 grams (0.02 mole) of o-chloranil in 50 milliliters of water. During the reaction the temperature rose to about 45° C. with all of the o-chloranil reactant disappearing within 0.5 hour and with the formation of cream-colored needles of the product. The reaction was allowed to stand overnight at room temperature to complete the reaction and to obtain the desired trisodium 4-chloro-5,6-dihydroxy-1,2,3-benzenetrisulfonate monohydrate product.

*Example 3.—Disodium 3,6-Dichloro-4,5-Dihydroxy-1,2-Benzenedisulfonate Sesquihydrate*

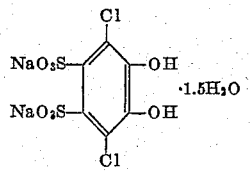

In a manner similar to that described in Example 2, four pounds of sodium sulfite was added portionwise with stirring to two pounds of o-chloranil in 20 pounds of water. The reaction mixture was stirred for several hours at reaction temperature, to produce trisodium 4-chloro-5,6-dihydroxy-1,2,3-benzenetrisulfonate and disodium 3,6-dichloro-4,5-dihydroxy-1,2-benzenedisulfonate products. The reaction mixture was allowed to cool to room temperature to precipitate trisodium 4-chloro-5,6-dihydroxy-1,2,3-benzenetrisulfonate. The latter was removed by filtration.

The filtrate was concentrated by heating under reduced pressure to precipitate the disodium 3,6-dichloro-4,5-dihydroxy-1,2-benzenedisulfonate product. The product after four recrystallizations from water was recovered as a white crystalline sesquihydrate salt having a molecular weight of 392 and elemental analysis as follows:

|  | Carbon | Hydrogen | Sodium | Sulfur |
|---|---|---|---|---|
| Found | 17.5 | 1.5 | 10.3 | 15.7 |
| Theoretical | 17.5 | 1.2 | 10.3 | 15.7 |

*Example 4*

In a manner similar to that described in Example 2, tripotassium 4-chloro-5,6-dihydroxy-1,2,3-benzenetrisulfonate and trilithium 4-chloro-5,6-dihydroxy-1,2,3-benzenetrisulfonate are prepared by reacting o-chloranil with potassium sulfite and lithium sulfite, respectively.

*Example 5.—4-Chloro-5,6-Dihydroxy-1,2,3-Benzenetrisulfonic Acid*

The trisodium 4-chloro-5,6-dihydroxy-1,2,3-benzenetrisulfonate is dissolved in water and the resulting aqueous solution poured through a column containing the acid form of Dowex 50 cation exchange resin and the effluent solution evaporated to dryness to obtain a 4-chloro-5,6-dihydroxy-1,2,3-benzenetrisulfonic acid product having a molecular weight of 288.6. (Dowex 50 is a sulfonated styrene-divinylbenzene copolymer.)

The chloropyrocatechol sulfonic acid compounds having the structure

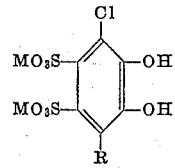

are useful as bactericides and fungicides adapted to be employed for the control of undesirable bacterial species such as *Aerobacter aerogenes, Erwinia carotovora, Salmonella typhosa* and *Staphylococcus aureus*, and undesirable fungal species such as *Penecillium digitatum, Alternaria solani, Phytophthora infestans, Aspergillus terreus* and *Rhizopus nigricans*.

In a representative operation as a parasiticide, control of the growth of fungal species such as *Alternaria solani* and *Phytophthora infestans* are obtained by spraying tomato plants infested with said organisms with an aqueous dispersion containing a chloropyrocatechol sulfonic acid compound at a concentration of 500 parts by weight per million parts by weight of dispersion.

In a representative operation as an antimicrobial agent, good controls of bacteria and fungi are obtained when nutrient agar media saturated with one chloropyrocatechol sulfonic acid compound is streaked with one or more species of bacteria or fungi and incubated at 30° C. for 3 days.

These pyrocatechol sulfonic acid compounds are also useful as herbicides, particularly as aquatic herbicides. In a representative operation of its use as aquatic herbicides, good controls of submersed and floating aquatic weeds, Ancharis sp., *Cabomba caroliniana*, and *Lysimastrum nummularis* are obtained when the weeds are exposed to aqueous medium containing a chloropyrocatechol sulfonic acid compound at a concentration of 500 parts by weight per million parts by weight of aqueous medium.

The compounds of the present invention are also useful as chelating agents, forming chelates with polyvalent metals such as iron, copper and tin. As chelating agents they may be employed in the many industrial uses of metal ion control.

I claim:
1. A chloropyrocatechol sulfonic acid compound having the formula

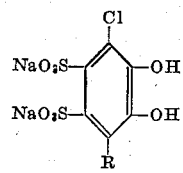

wherein R is selected from the group consisting of —Cl and —SO₃Na.

2. Trisodium 4-chloro-5,6-dihydroxy-1,2,3-benzenetrisulfonate.

3. Disodium 3,6-dichloro-4,5-dihydroxy-1,2-benzenedisulfonate.

References Cited in the file of this patent

Beilstein: "Handbuch der Organischen Chemie," vol. 11, p. 301 (1928).
Gareau: "Comptes rendus," vol. 206, pp. 256–8 (1938).
Groggins: "Unit Processes in Organic Synthesis," fifth edition, p. 333 (1958).